United States Patent [19]

Cain et al.

[11] Patent Number: 4,679,937
[45] Date of Patent: Jul. 14, 1987

[54] SELF LEVELING TRANSMITTER FOR LASER ALIGNMENT SYSTEMS

[75] Inventors: Gary L. Cain, Springfield; Lawrence J. Meyers, Dayton; Ted L. Teach, Dayton, all of Ohio; Joseph F. Rando, Los Altos Hills, Calif.; Theodore J. Markley, Vandalia, Ohio

[73] Assignee: Spectra-Physics, Inc., San Jose, Calif.

[21] Appl. No.: 788,800

[22] Filed: Oct. 18, 1985

[51] Int. Cl.$^4$ ............................................. G01B 11/26
[52] U.S. Cl. ................................... 356/138; 356/149; 356/250
[58] Field of Search ............... 356/138, 148, 149, 153, 356/248, 249, 250; 33/DIG. 21

[56] References Cited

U.S. PATENT DOCUMENTS

| | | | |
|---|---|---|---|
| 2,191,379 | 2/1940 | Glasgow | 240/1.2 |
| 3,229,099 | 1/1966 | Schwinghamer | 250/201 |
| 3,253,138 | 5/1966 | Nagel | 240/11.2 |
| 3,383,511 | 5/1968 | Palser | 250/203 |
| 3,426,144 | 2/1969 | Roth | 178/6.6 |
| 3,432,766 | 3/1969 | Morantz | 331/94.5 |
| 3,471,234 | 10/1969 | Studebaker | 356/3 |
| 3,485,546 | 12/1969 | Roth | 350/7 |
| 3,582,214 | 6/1971 | Loomis | 356/154 |
| 3,588,249 | 6/1971 | Studebaker | 356/4 |
| 3,609,584 | 9/1971 | Stitch | 331/94.5 |
| 3,610,912 | 10/1971 | Schwartz | 240/1.2 |
| 3,634,675 | 1/1972 | Madsen | 240/1.2 |
| 3,656,828 | 4/1972 | Scholdstrom | 356/138 X |
| 3,684,381 | 8/1972 | Zoot | 356/138 |
| 3,820,903 | 6/1974 | Kindl et al. | 356/138 |
| 3,982,839 | 9/1976 | Schwartz | 356/138 X |
| 4,111,564 | 9/1978 | Trice, Jr. | 356/247 |
| 4,221,483 | 9/1980 | Rando | 356/250 |

FOREIGN PATENT DOCUMENTS 1059300 2/1967 United Kingdom .
329383 11/1972 U.S.S.R. .

OTHER PUBLICATIONS

Product Literature entitled "GKO-A The Rugged One", distributed by Kern Instruments, Inc., 111 Bowman Ave., Port Chester, N.Y. 10573, admitted prior art.

*Primary Examiner*—Eugene R. LaRoche
*Assistant Examiner*—Steven J. Mottola
*Attorney, Agent, or Firm*—Quarles & Brady

[57] ABSTRACT

A transmitter for an alignment system in which a field of electromagnetic radiation is propagated in a non-planar reference cone is disclosed. The transmitter includes a source for providing a collimated beam of electromagnetic radiation directed parallel to a beam axis. A cantilever strand supports a bob within the beam. The bob has a conical reflecting surface to reflect the collimated beam conically. Optimally, the cantilever strand and bob are chosen to provide a deflection between the bob and plumb which is substantially one-half of any angular error between the beam axis and plumb. In an especially preferred form, a housing surrounds the bob and has inner and outer surfaces which minimize temperature effects on the orientation of the reference plane. Also, detectors are provided to sense when the angular error between the beam axis and plumb is outside of an acceptable range.

12 Claims, 19 Drawing Figures

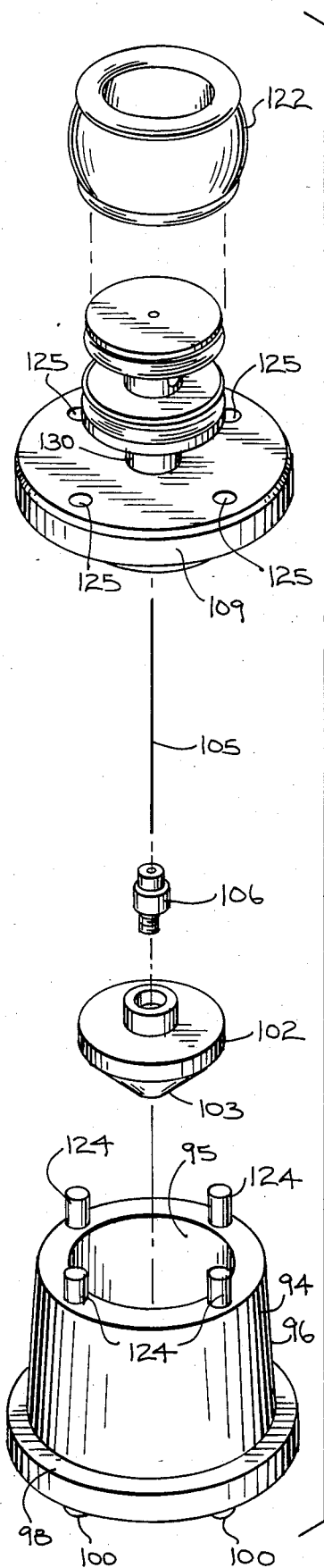
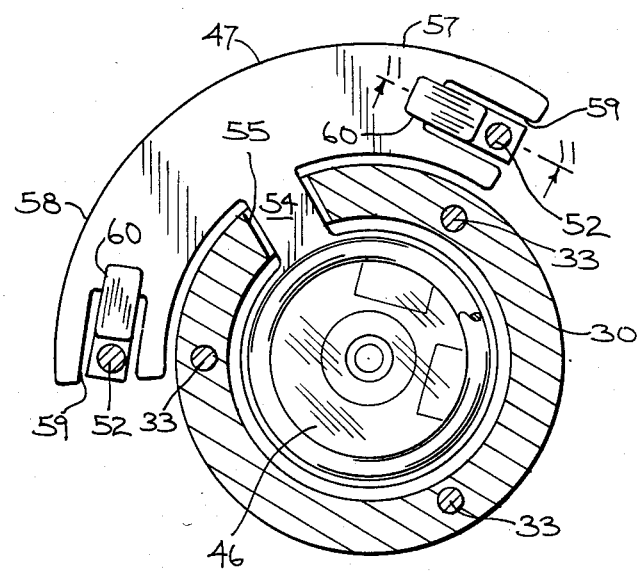
FIG. 9
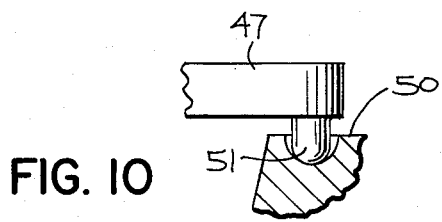
FIG. 10
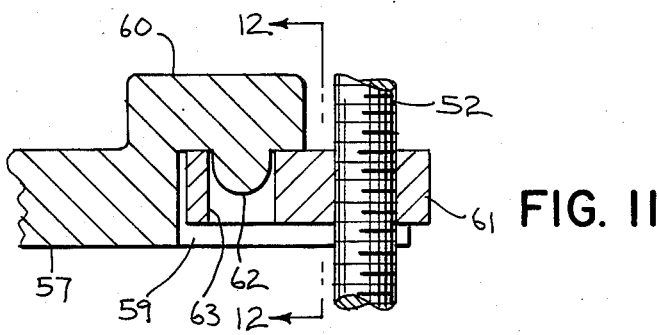
FIG. 11
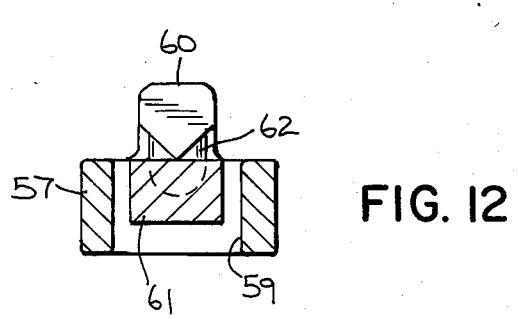
FIG. 12
FIG. 8

SELF LEVELING TRANSMITTER FOR LASER ALIGNMENT SYSTEMS

BACKGROUND OF THE INVENTION

This invention relates to a transmitter for providing a non-planar reference cone of electromagnetic radiation.

Electromagnetic radiation has been applied in the construction industry to provide a reference for leveling and alignment. It has been found particularly useful because it propagates along a straight line, provides a continuous reference over time, and can be provided in a portable unit. In many applications where two or more workers were required with prior aligning techniques, only one man is now necessary to perform the same task with equal or greater accuracy.

It has often been desirable to have an omni-directional leveling or aligning capability. For example, in hanging a ceiling, installing a computer floor, or in grading a field, it has been desirable to have each point in the ceiling, floor or field lie in a common, horizontal plane.

An omni-directional field of radiation can be generated in a plane to provide an omni-directional aligning capability. However, for leveling, the plane must itself be extremely close to level. This is because any error in the level of the plane is amplified by a factor proportional to the distance from the transmitter of the plane. For a reference measurement taken 100 feet from the transmitter, an error in the orientation of the plane of only one degree from horizontal results in the reference measurement being 21 inches off from the desired grade, which is usually not acceptable.

Moreover, it is not economically possible to meticulously level the radiation plane at the construction site to provide the desired degree of accuracy with respect to horizontal every different time the transmitter is used. Also, particularly with alignment applications of long distances, an alignment plane is not suitable. Because the earth's surface is curved, an alignment plane can be inaccurate and not appropriate for alignment purposes. Consider the use of a plane of light as an alignment tool at 1,000 ft. Due to the earth's curvature, the alignment error will be 0.284 inches. Instead of creating a horizontal plane, a descending reference cone of electromagnetic energy which substantially follows the earth's curvature may be desirable. Therefore, a need exists for a transmitter which can be quickly and easily set up at a construction site and which will produce a non-planar reference cone which provides alignment and substantially follows the curvature of the earth to make alignment even more accurate than reference planes.

SUMMARY OF THE INVENTION

The invention provides a transmitter for an alignment system in which a field of electromagnetic radiation is propagated as a non-planar reference cone. The transmitter includes a source for providing a collimated beam of electromagnetic radiation directed parallel to a beam axis. Suspension means support a bob within the beam which has a conical reflecting surface to reflect the collimated beam conically. The suspension means provide an angular deflection of the bob from plumb which will accurately compensate for small errors or changes in the initial set-up of the transmitter. Optimally, the deflection between the bob and plumb is substantially one-half of the angular error.

This arrangement results in the transmitter being self-leveling. For set-up in the field, the transmitter need not be accurately leveled, but need only be leveled within the accuracy range of a bubble-type level indicator. This can be performed quickly and easily. Although leveling with the bubble-type indicator does not result in the transmitter being as accurately level as required for the outgoing radiation reference cone, the reference cone is nonetheless very accurately level with respect to the curvature of the earth to provide accurate reference measurements even at relatively great distances from the transmitter.

In a preferred form, a cantilever strand is employed for suspending the bob in the beam. The cantilever strand has an upper end fixed to support means and a lower end fixed to the bob. The cantilever strand has uniform omni-directional stiffness characteristics and is linear over an acceptable error range.

In another aspect, a housing surrounds the bob. The housing has an inner surface and an outer surface and is made of a transparent material so that the reflected beam can pass through the housing from the inner to the outer surface. The housing protects the bob from dirt and moisture which can affect the efficiency of the reflecting surface and can be filled with a transparent liquid to dampen movements of the bob to make the transmitter shock and vibration resistant. Also, the inner and outer surfaces of the housing can be made conical, with the relationship between the cone angles of the respective inner and outer surfaces being chosen to minimize temperature effects on the orientation of the non-planar reference cone. In this form, the radiation is reflected from the bob at an angle to the reference cone. The radiation is then adjusted in direction by refraction through the housing so that it emerges from the housing in the non-planar reference cone, which is level with respect to the curvature of the earth even at relatively great distances from the transmitter.

In yet another aspect, a sensor means is provided in the transmitter which detects when the angular error between the beam axis and plumb is outside of an acceptable range. The sensor means can include a detector means spaced a distance beneath the bob and a reflector surface on the bob for directing radiation back to the detector means. In one embodiment, the detector means includes a pair of detectors arranged to sense a ring of light reflected by a conical reflector surface. In another embodiment, the detector means includes a single detector and the reflector surface in planar at an angle to reflect a generally circular spot of light back to the detector.

It is therefor a principal object of the invention to provide a transmitter which provides a non-planar reference cone of radiation accurately level with respect to the earth's curvature.

It is another object of the invention to provide a transmitter which can be quickly and easily set up but will still provide an accurately level non-planar reference cone of radiaton with respect to the earth's curvature.

It is another object of the invention to provide a durable transmitter of an accurately level non-planar reference cone of radiation.

It is another object of the invention to provide a transmitter of an accurately level non-planar reference cone of radiation which can be inexpensively manufactured.

These and other advantages and aspects of the invention will become apparent from the drawings and from the detailed description.

DESCRIPTION OF THE DRAWINGS

FIG. 8 is an exploded perspective view of a reflector assembly for the lighthouse assembly of FIG. 7;

FIG. 9 is a sectional view taken along the plane of the line 9—9 in FIG. 6;

FIG. 10 is a fragmentary detail view of a portion of the assembly shown in FIG. 6;

FIG. 11 is a sectional view taken along the plane of the line 11—11 of FIG. 6;

FIG. 12 is a sectional view taken along the plane of the line 12—12 of FIG. 11.

DETAILED DESCRIPTION OF THE PREFERRED EMBODIMENT

Figure 1:
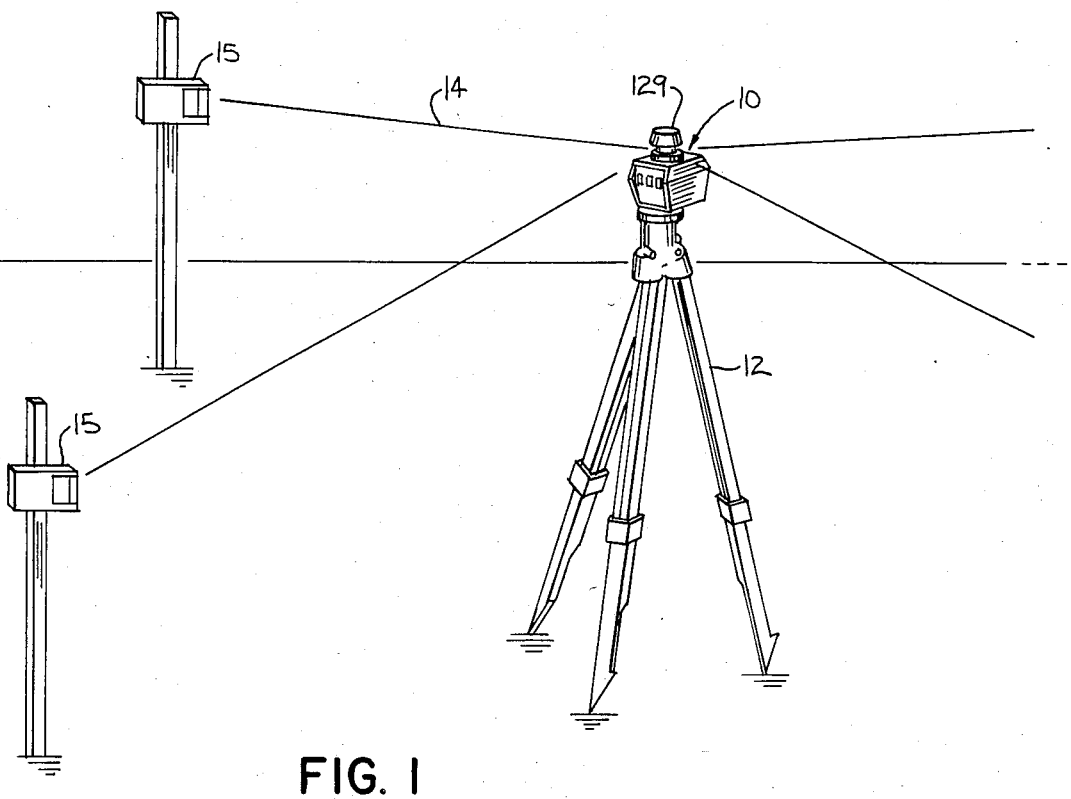
FIG. 1 is a perspective view of a transmitter of the invention in operation.

FIG. 1 shows a transmitter 10 of the invention in operation. The transmitter 10 is level mounted at a desired grade on a tripod 12. The transmitter 10 emits a field of electromagnetic radiation in a non-planar reference cone 14 which declines from the horizontal in an amount sufficient to be substantially equidistant from the earth at each point along the reference cone.

The reference cone 14 is detected by remote receivers 15 to position each receiver 15 at the height of the reference cone 14. Receivers 15 suitable for use with a transmitter 10 of the invention are more fully described in co-pending U.S. patent applicaton Ser. No. 788,764 entitled Laser Alignment System With Modulated Field, which was filed on even date herewith and is hereby incorporated by reference.

The reliability of the reference measurements depends upon how level the reference cone 14 is and the distance from the transmitter 10 that the reference measurements are taken. This distance may be on the order of one hundred or more feet. In the same application, the required accuracy may be measured in inches or even fractions of an inch.

Figure 2:
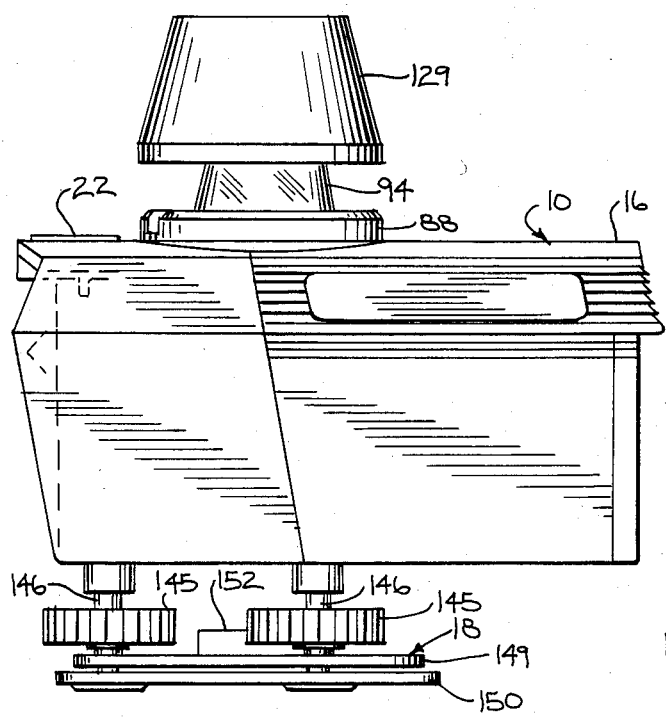
FIG. 2 is a side plan view of the transmitter.
Figure 3:
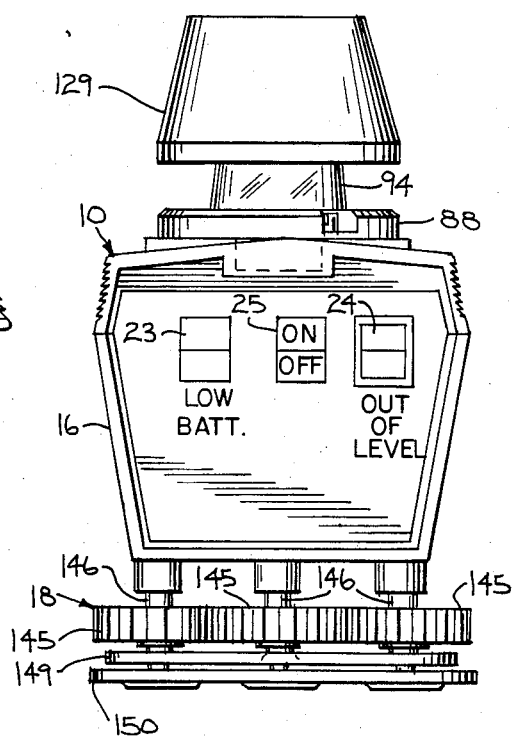
FIG. 3 is a front plan view of the transmitter.
Figure 4:
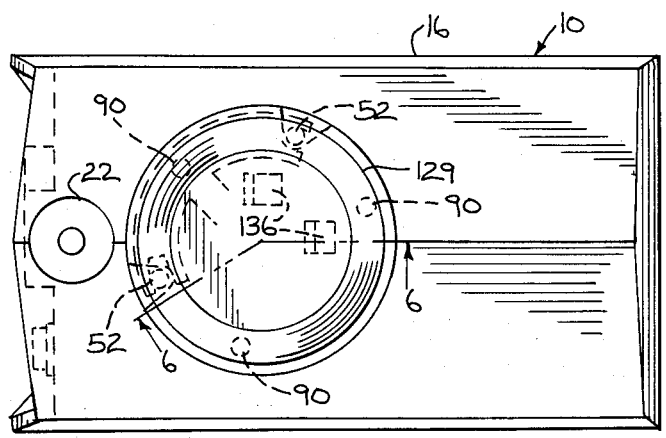
FIG. 4 is a top plan view of the transmitter.

Referring to FIGS. 2 through 4, the transmitter 10 has a chassis 16 which is supported on a leveling base 18. Batteries 20 (shown in phantom in FIG. 5) are stored in the chassis to provide a power supply for the transmitter 10 so that it is portable. A bubble-type level indicator 22 is provided in the chassis 16 for relatively rough leveling of the transmitter 10 by adjusting the mounting base 18. A low battery indicator light 23 and an out of level indicator light 24 are provided on a front panel of the chassis 16 along with an on-off switch 25.

Figure 5:
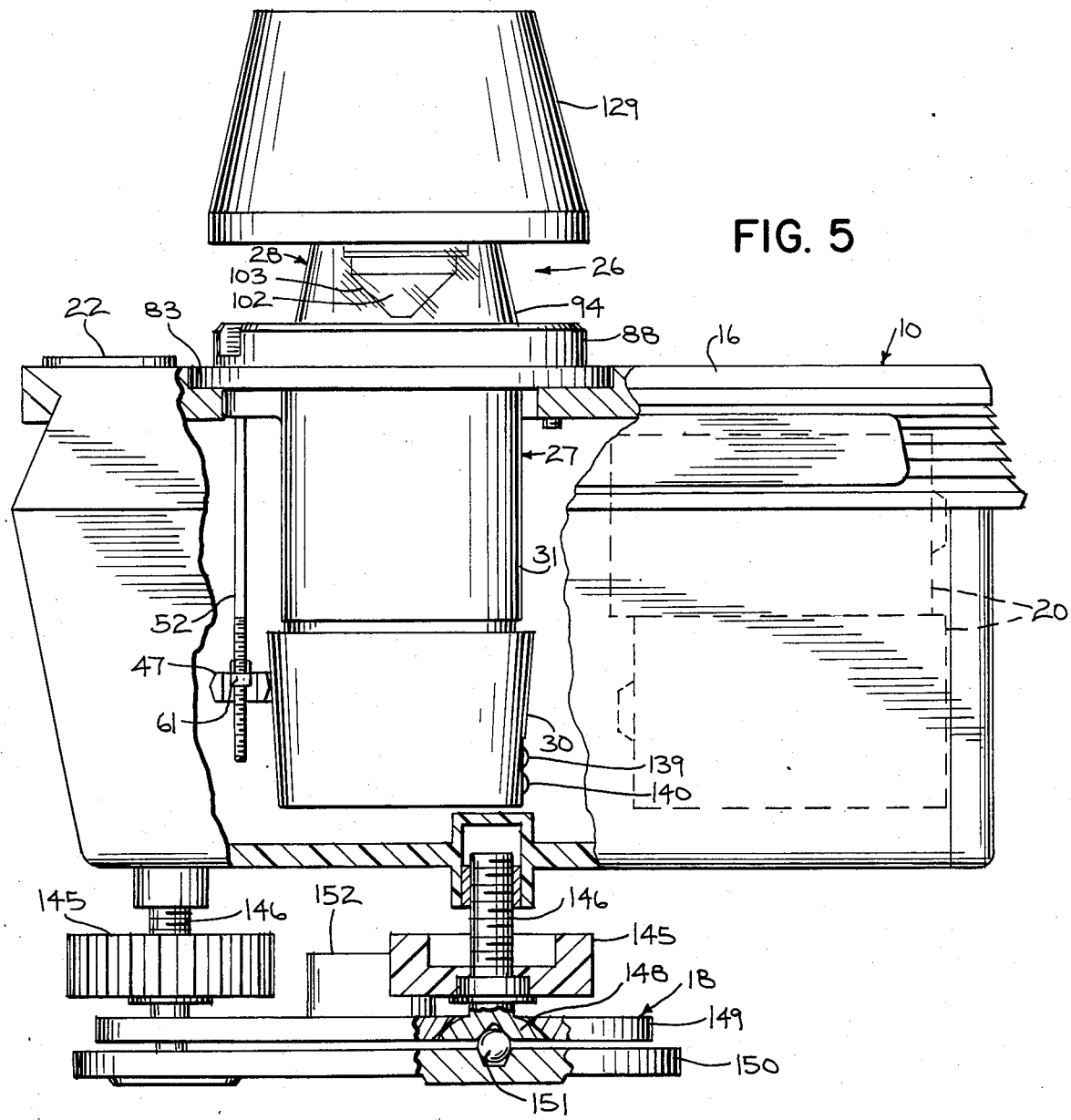
FIG. 5 is a side plan view of the transmitter with portions broken away revealing a lighthouse assembly.
Figure 6:
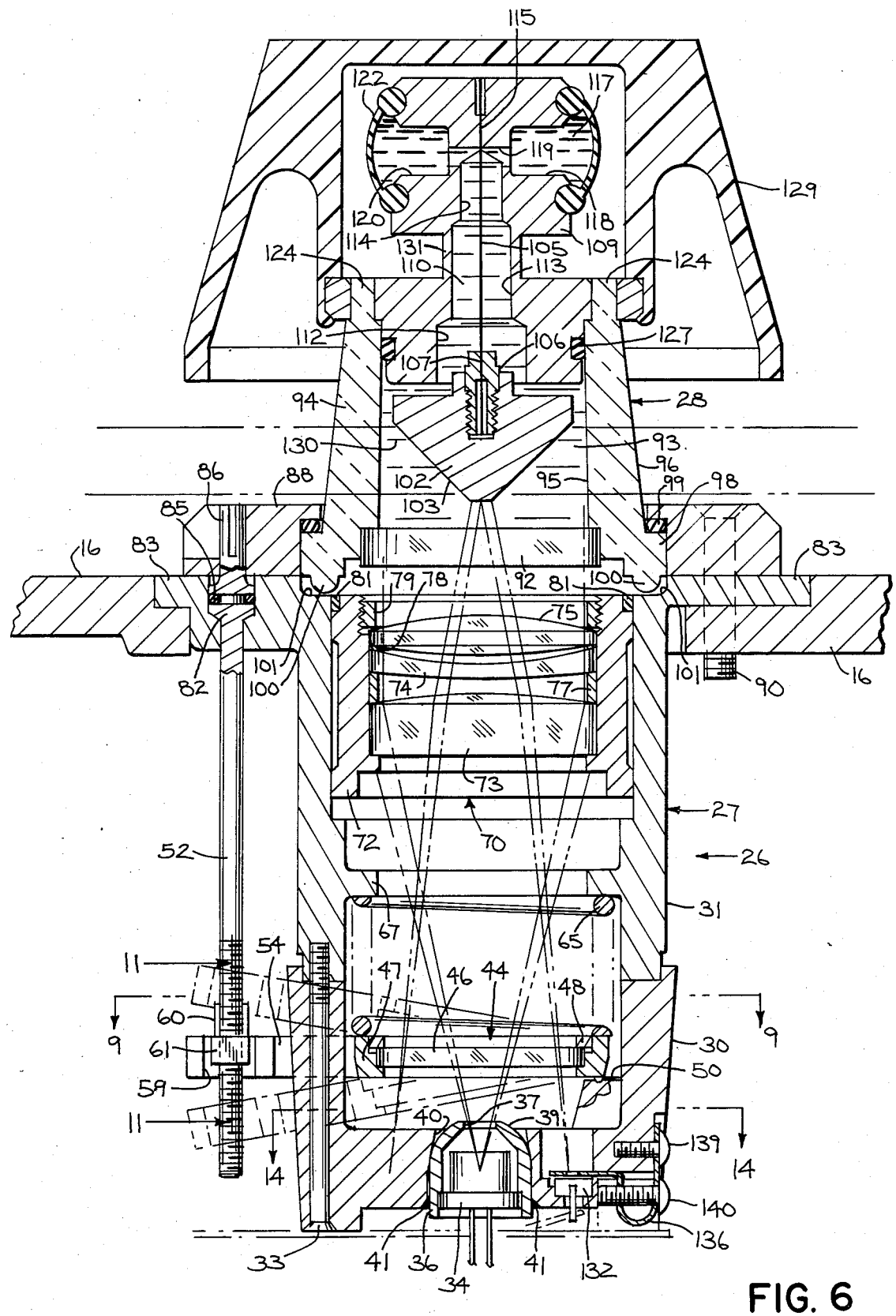
FIG. 6 is a sectional view taken along the line 6—6 of FIG. 4.
Figure 7:
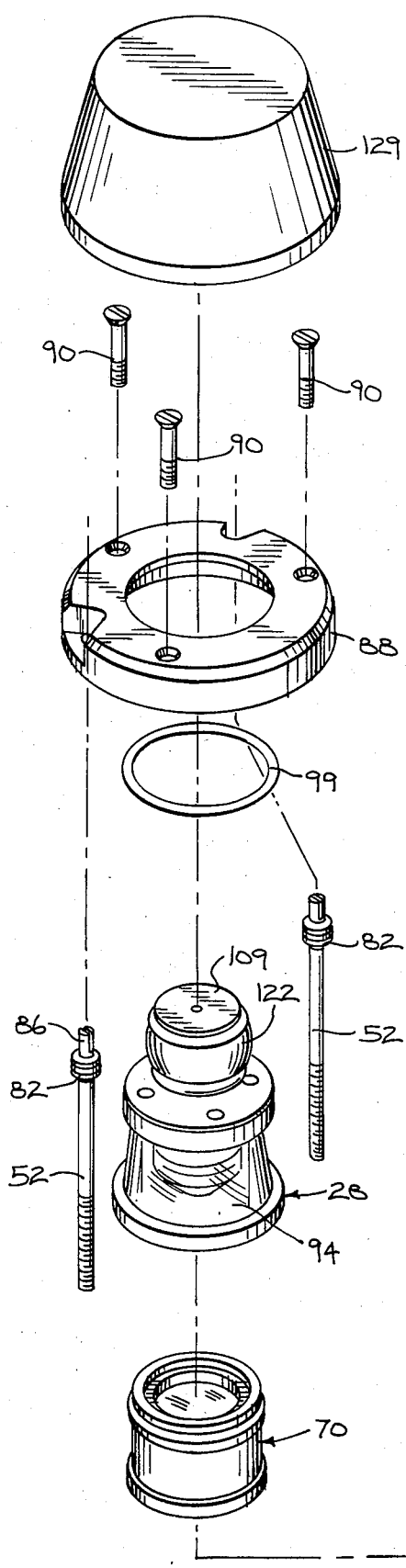
FIG. 7 is an exploded perspective view of the lighthouse assembly.
Figure 7:
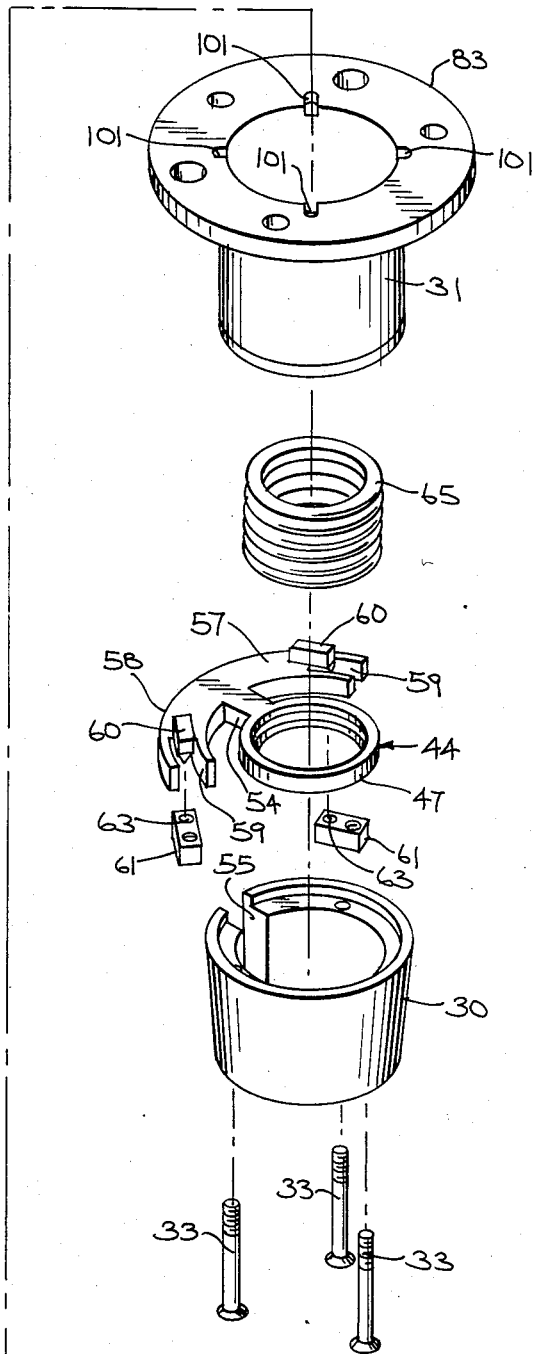

Referring to FIGS. 5 and 6, a lighthouse assembly 26 which includes a source 27 and a reflector assembly 28 forms a major component of the transmitter 10. The source 27 provides a collimated beam of electromagnetic radiation into the bottom of the reflector assembly 28. The reflector assembly 28 redirects the collimated beam into the reference cone 14 which emerges conically from the reflector assembly 28 in a downward direction to closely approximate the curvature of the earth.

Figure 14:
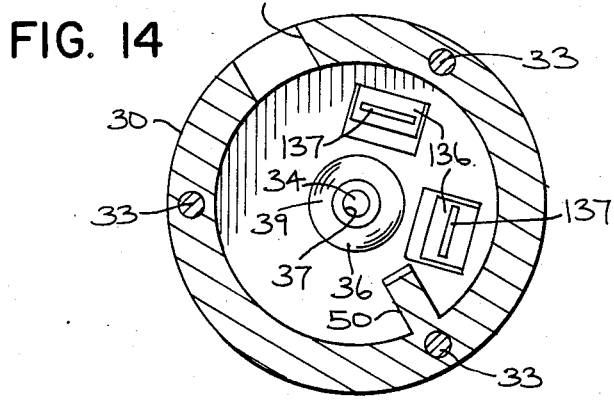
FIG. 14 is a sectional view taken along the plane of the line 14—14 of FIG. 6.

The source 27 includes a lower housing 30 and an upper housing 31. As best shown in FIG. 6, an annular groove in the top of the lower housing 30 receives the lower end of the upper housing 31 and the lower housing is secured to the upper housing with three bolts 33 (FIG. 14). An emitter 34, which in the preferred embodiment is a 3.5 millwatt laser diode which emits radiation at a nominal wavelength of 780 nanometers, is bounded in a shroud 36. The shroud 36 has an aperture 37 to allow the radiation to propagate from the source and has a frusto-spherical outer surface 39. The frusto-spherical outer surface 39 is received by a conical surface 40 formed in the lower housing 30 to allow aiming of the emitter 34. When the emitter 34 is properly aimed as explained below, the shroud 36 is bonded to the lower housing 30 at 41.

Radiation from the emitter 34 is next incident upon a steering window 44, is to allow fine adjustments in the aiming of the radiation from the emitter 34. Aiming by the steering window 44 is accomplished by changing the orientation of the steering window to shift the radiation by refraction through a flat lens 46 which is held in a frame 47 by a snap ring 48. The frame 47 is tri-point mounted in the lower housing 30 to enable adjusting the orientation of the steering window 44. As best shown in FIG. 10, a ledge 50 is formed in the lower housing 30 which has an upwardly opening recess into which a rounded projection 51 of the frame 47 fits with enough clearance to allow the steering window to be tilted. The other two pivot points are provided by a pair of adjusting screws 52.

As shown in FIG. 9, the frame 47 has a neck 54 which extends through a slot 55 in the lower housing 30. Arms 57 and 58 extend from each side of the neck 50 over to the adjusting screws 52. The end of each arm 57 and 58 has a slot 59 as best shown in FIGS. 11 and 12 and a knife edge structure 60 is formed on each arm which overhangs the slot 59. Each adjusting screw 52 is threaded into a block 61 which fits within one of the slots 59 and bears against the knife edge. The knife edge structure 60 is also provided with a nipple 62 which fits into a hole 63 in the block 61 with sufficient clearance to allow tilting of the steering window 44. A compression spring 65 is provided between the steering window 44 and a flange 67 of the upper housing 31 to bias the steering window downwardly.

After passing through the steering window 44, the radiation is incident upon a collimating lens assembly 70 disposed in the upper housing 31. The collimating lens assembly 70 redirects the incoming, diverging radiation to propagate parallel to a beam axis, which is parallel to the longitudinal axis of the lens assembly 70. The collimating lens assembly includes a sleeve 72, three lenses 73, 74 and 75, spacers 77 and 78 between the lenses, and a collar 79 to hold the lenses in the sleeve 72. Collimating lenses of the type shown are well known in the optics art and are commercially available from sources such as Universe Kogaku (America), Inc., Glenn Cove, N.Y. 11542. The lens assembly 70 is slidable within the upper housing 31 to enable focusing. When the lens assembly 70 is properly focused, the sleeve 72 is bonded to the upper housing at 81.

The adjusting screws 52 each have a shoulder 82 received by a flange 83 of the upper housing. The shoulder 82 has a groove within which an O-ring 85 is disposed to hold the adjustment of the adjusting screw 52 against vibration and accidental handling. Slotted ends 86 of the adjusting screws 52 extend up through a retainer ring 88 so that the adjusting screws 52 are accessible from outside the transmitter 10. The retainer ring 88 is bolted to the transmitter 10 by three bolts 90 to secure the source 27 to the transmitter and to clamp the reflector assembly 28 to the source,.

The collimated beam enters the bottom of the reflector assembly 28 through a flat lens 92 which seals off an inner space 93 defined by a housing 94. The housing 94 has an inner surface 95, an outer surface 96 and is made of a transparent material such as acrylic. The housing 94 has a flange 98 which is clamped against the upper housing 31 by the retainer ring 88. An O-ring 99 resides between the flange 98 and the retainer ring 88 to seal the inside of the lighthouse assembly 26 from dirt and moisture. Four equally spaced-apart domes 100 are formed on the lower side of the flange 98 which are received in grooves 101 in the upper housing 31. The grooves 101 are about as wide as the domes 100 but allow the domes to move in the radial direction relative to the upper housing 31. This arrangement allows for thermal expansion and contraction of the housing 94.

The collimated beam from the source 27 is next incident upon a bob 102 disposed in the inner space 93. The bob 102 has a frusto-conical surface 103 which is directed toward the oncoming collimated beam. The collimated beam is reflected by the surface 103 and emerges therefrom conically at an angle to horizontal so that it is not planar but forms a cone within the housing 94, as described below. The bob 102 may be made from aluminum with conical surface 103 diamond turned to provide a mirror-like finish.

The bob is suspended within the inner space 93 by a cantilever strand 105 which is a 0.009 inch diameter stainless steel wire in the preferred embodiment. The cantilever strand 105 is fixed to the bob by a press fit provided in a fastener 106 which is threaded into the bob 102. The press fit is accomplished by tapering the lower end of the strand 105, inserting the tapered end into the top end of a bore 107 in the fastener 106, the bore 107 being slightly smaller than the untapered diameter of the strand 105. The tapered end is then grasped from the other side of the bore 107 and the strand 105 is pulled into the bore 107 until it interferes with the fastener 105 in the bore 107.

The same connecting process is used to secure the upper end of the strand 105 to a cap 109 which provides a support means for the bob 102. The strand 105 extends up through a longitudinal passageway 110 including the bores 112, 113 and 114 in the cap 109 and is press fitted in a bore 115 by the process described above. A lateral pasageway 117 including the bores 118, 119, and 120 is in communication with the longitudinal passageway 110. A rubber diaphram 122 seals the lateral and longitudinal passageway from dirt and moisture.

The cap 109 is secured to the housing 94 by four projections 124 which extend up through holes 125 in the cap 109. The ends of the projections 124 are expanded in a staking operation to lock the cap 109 on the housing 94. An O-ring 127 disposed in a groove around the cap 109 seals the inner space 93.

A sunshade 129 is fitted onto the cap 109. The sunshade 129 shields the reflector assembly 28 against non-uniform solar heating to prevent non-uniform thermal expansion of the reflector assembly, which can affect calibration.

To provide a non-planar reference cone which approximates the curvature of the earth, the transmitter 10 is calibrated as follows. First, the longitudinal axis of the collimating lens assembly 70 is aligned with plumb. The top of the cap 109 is then grasped with a suitable tool and bent slightly to align the longitudinal axis of the conical surface 103 of the bob 102 to be plumb so that the longitudinal axis of the lens assembly 70 and conical surface 103 are both paralel and plumb. Bending of the cap 109 is facilitated by the relatively small cross-section of the cap walls at 131.

To provide as much uniformity as practical in the conical-directional energy distribution of the radiation reference cone outgoing from the housing 94, the longitudinal axis of the conical surface 103 must be aligned to the energy center, that is, the beam axis, of the incoming collimated beam when the transmitter 10 is plumb. That is roughly adjusted by aiming the emitter 34 so that the energy detected in each quadrature of the outgoing reference cone is approximately equal to the energy detected in the opposite quadrature. A more precise adjustment is provided by the steering window 44. By turning the adjusting screws 52, the orientation of the steering window is adjusted to determine the amount and the direction that the incoming radiation beam is shifted by refraction as it passes through the lens 46 of the steering window 44. The adjusting screws 52 are turned until the energy detected in each quadrature is as nearly equal to the energy detected in the opposite quadrature as possible.

To calibrate the transmitter to plumb and to align the beam axis of the collimated beam to the axis of the conical surface 103, a single calibration fixture can be used. In its simplest form, the fixture would include four of the receivers 15 described in U.S. patent application Ser. No. 788,764, referred to above. The receivers 15 would be spaced equal distances apart from a center in a reference cone, each receiver being separated angularly by 90° from the next adjacent receiver. A fixture adapted to hold the lighthouse assembly 26 plumb would be installed at the center and could be adjustable vertically. The cap 109 would then be adjusted and the vertical height of the fixture adjusted until all four receivers indicated that they were "on grade" which would indicate that the reference cone was in alignment.

To provide an indication of when the energy center of the collimated beam was aligned with the axis of the conical surface 103, the receivers could be modified to indicate the total amount of energy each was detecting. When the total energy detected by each receiver was equal to the energy detected by the 180° opposite receiver, the energy center (beam axis) of the collimated beam would be aligned to the axis of the conical surface 103. Note that the energy detected by 180° opposite receivers is compared because the cross-section of the collimated beam is not necessarily circular, but more likely oval. Also, it may be desirable to repeat the horizontal adjustment after the centering adjustment has been performed for greater accuracy.

The final calibration step would be to install the calibrated lighthouse assembly 26 in the chassis 16 with the collimating lens 70 axis (and also the conical surface 103 axis) plumb. The bubble-type level indicator 22 would then be adjusted to indicate that the transmitter was level.

In the field, the collimating lens axis will not always be plumb. Rather, there will normally be some small error between the collimating lens axis and plumb. However, even a small error can result in faulty reference readings, particularly when the readings are taken at relatively large distances away from the transmitter.

To compenste for error between the collimating lens axis and plumb, a transmitter of the invention is self leveling within an error range about plumb. As noted above, if the collimating lens 70 axis is plumb, the electromagnetic radiation emanating from the housing 94 will be in a non-planar reference cone which approximates the curvature of the earth. If an error develops between the collimating lens axis and plumb, the bob 102 will deflect relative to the collimated beam a certain amount less than the error since the cantilever strand has a finite stiffness. The amount of deflection depends upon the weight of the bob/strand assembly and the stiffness and length of the cantilever strand.

Optimally, the strand 105, screw 106 and bob 102 are chosen to provide a deflection substantially equal to one-half of the error between the collimating lens axis and plumb. With this amount of deflection of the conical surface axis, the axis of the non-planar reference cone 14 will remain plumb so that the reference cone 14 will continue to emanate in its proper orientation to the earth. The reference cone 14 will therefore continue to decline from the horizontal in an amount sufficient to be substantially equidistant from the earth at each point along the reference cone, even if there is an error between the transmitter 10 and plumb. This is because, according to the law of reflection, the angle of incidence equals the angle of reflection. Since a change in the orientation of the bob 102 affects both the angle of incidence and the angle of reflection, the deflection of the bob 102 should be one-half of the error between the transmitter 10 and plumb to provide no change in the orientation of the outgoing reference cone.

It is important that the strand 105 be of the same stiffness in all directions perpendicular to the axis of the strand, that is, omni-directionally. This is important so that the deflection of the bob will be the same for a given error regardless of the direction of the error. Note that the press fit means of mounting the strand to the cap 109 and to the bob 102 helps assure omni-directional uniformity in the stiffness of the strand 105 by preventing kinks or buckling where the strand is attached to the cap 109 and screw 106.

To dampen movements of the bob 102, the inner space 93, the longitudinal passageway 110, and the lateral passageway 117 are filled with a transparent fluid 130. The fluid 130 is viscous to provide good damping properties. In practice, a silicon fluid sold under the trade designation Dow 200 by Dow Chemical Co. was found suitable. The diaphragm 122 seals the fluid 130 within the reflector assembly 28. Preferably the diaphragm 122 is slightly stressed by the fluid 130 in ambient temperatures so that as the fluid expands and contracts with changes in temperature, the diaphragm prevents any voids forming in the reflector assembly 28.

The fluid 130 used has a density greater than that of air. Therefore the fluid 130 has a buoyant effect upon the bob/strand assembly. This buoyant effect must, of course, be accounted for in matching the bob 102 and strand 105 to provide a deflection of the bob substantially equal to one-half of the error from plumb.

The angle of the conical surface 103 is selected to provide the desired non-planar reference cone of radiation emerging from the housing 94. Due to the effects of refraction as the reflected beam passes from the fluid 130 to the housing 94 and then from the housing 94 to air, the reflected beam will not be at the angle of the reference cone 14 as it passes through the fluid or through the housing as shown by the ray diagram of FIG. 13. Rather, the radiation path through the fluid and the housing 94 forms two cones, each of which diverges upwardly. The cone angle of the bob 102 is therefore dependent upon the indices of refraction of the fluid 130 and of the material of the housing 94, and upon the angles of the inner surface 95 and of the outer surface 96 of the housing 94.

Figure 13:
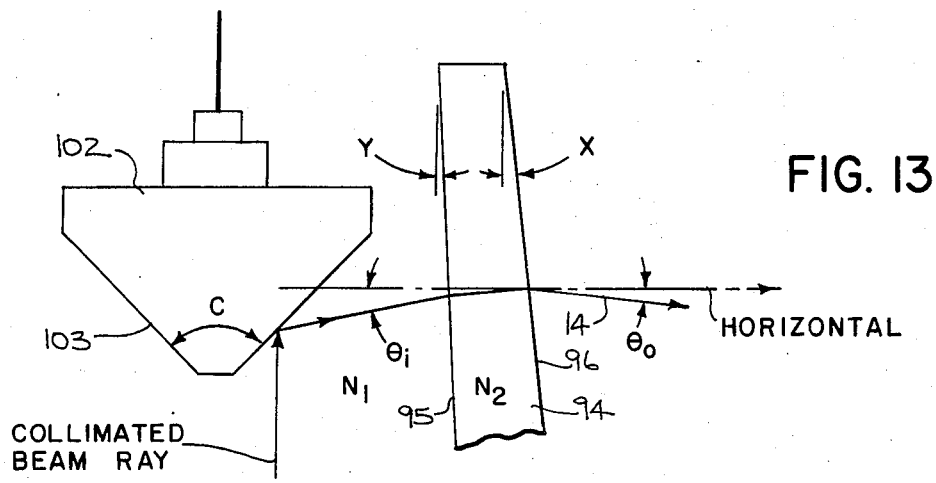
FIG. 13 is a schematic ray diagram for a poriton of the reflector assembly.

For the typical use where instrument tilt of lighthouse assembly 26 is zero (the collimated beam and bob 102 axis are vertical), the collimated ray of FIG. 13 impinges on the surface 103 whose angle to the axis of bob 102 is preferably less than 45° (the bob 102 apex angle "C" also being less than 90°) which results in a reflected ray making an angle $\theta_i$ with the horizontal. Wall 95 is inclined at an angle Y with the vertical. The reflected ray (cone of light) is refracted by housing 94 and emerges as the non-planar reference cone 14 at an angle $\theta_o$ with the horizontal, depending on the small angle relationship derived by Snell's Law:

$$\theta_o = n_1\theta_i - (n_1-1)Y - (n_2-1)(X-Y)$$

where $n_1$, $n_2$, X and Y are defined hereafter in this disclosure. Angle "C", $n_1$, $n_2$, X and Y are chosen in a manner to minimize temperature effects and to place $\theta_o$ slightly below horizontal in order to form the non-planar reference cone 14 which positions each point along the reference cone substantially equidistant from the earth.

If a horizontal reference plane were formed rather than a non-planar reference cone, at 1,000 ft. the alignment error would be 0.284 inches and the angular error 0.0000234 radians. Significantly, the non-planar reference cone 14 is a more reliable alignment guide than a horizontal plane.

One problem is that the indices of refraction of the fluid 130 and housing 94 vary with temperature. That is, for a given cone angle, inner surface angle and outer surface angle that provides an emerging reference cone 14 at a certain angle $\theta_o$ at one temperature, the emerging cone may not be at $\theta_o$ at another temperature. Since the transmitter 10 must be capable of operating over a range of temperatures and small errors in the level of the emerging reference cone produce larger errors in reference measurements, it is desirable to minimize temperature effects on the angle of the outgoing reference cone 14.

Therefore, the inner 95 and outer 96 surface angles are matched to minimize temperature dependence on the angle of the emerging reference cone 14. The angles X and Y of the respective outer and inner surfaces as shown in FIG. 13 are chosen to fulfill the relationship:

$$\left\{\frac{n_2}{n_1}\sin\left[Y-X-\frac{\sin(\theta_o+X)}{n_2}\sin^{-1}\right]\right\}\sin^{-1}=$$

$$\left\{\frac{N_2}{N_1}\sin\left[Y-X-\frac{\sin(\theta_o+X)}{N_2}\sin^{-1}\right]\right\}\sin^{-1}$$

where
$n_1$ = the index of refraction of the fluid 130 at a first temperature,
$n_2$ = the index of refraction of the housing 94 at the first temperature,
$N_1$ = the index of refraction of the fluid 130 at a second temperature, and
$N_2$ = the index of refraction of the housing 94 at the second temperature.

Preferably, the first and second temperatures should be chosen at the ends of the expected operating temperature range of the transmitter 10.

Once values of X and Y are determined that satisfy the above relationship, the angle $\theta_i$ is determined according to the small angle relationship given above. Then the included angle C of the conical surface can be solved for as follows:

$$C = 90° - \theta_i$$

As the temperature changes, the buoyancy of the fluid 130 also changes. Changes in the buoyancy of the fluid 130 affect the weight of the bob/strand assembly which changes the angle of $\theta_i$. This change in buoyancy should also be accounted for in selecting the angles X and Y of the respective outer and inner walls to minimize the effects of temperature on the performance of the transmitter 10.

The change $\Delta\theta_i$ in the angle $\theta_i$ attributable to a change in buoyancy as the temperature goes from the first temperature to the second temperature can be calculated by subtracting the angle $\theta_{is}$ at the second temperature from the angle $\theta_{if}$ at the first temperature. Values for X and Y are then chosen to fulfill the relationship:

$$\left\{\frac{n_2}{n_1}\sin\left[Y-X-\frac{\sin(\theta_o+X)}{n_2}\sin^{-1}\right]\right\}\sin^{-1}-$$

$$\left\{\frac{N_2}{N_1}\sin\left[Y-X-\frac{\sin(\theta_o+X)}{N_2}\sin^{-1}\right]\right\}\sin^{-1}=\Delta\theta_i$$

Once values for X and Y are determined, the cone angle C is determined as above, preferably for the most common temperature at which the transmitter is expected to operate. Note that with this arrangement, the cone angle C will always be less than 90°.

The deflection characteristics of the bob 102 are only linear over a certain range. Outside of that range, the deflection of the bob will not be substantially one-half of the error from plumb so that the outgoing radiation reference cone will deviate from its proper orientation.

Therefore, another aspect of the invention is to provide means for detecting when the bob 102 is outside of an acceptable deflection range.

Figure 15:
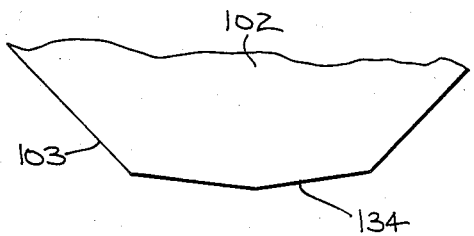
FIG. 15 is a detail view of the tip of a bob for the reflector assembly.

In the embodiment shown in FIG. 14, a pair of detectors 132 (FIG. 6) are provided in the base of the lower housing 30 and are arranged about the longitudinal axis of the lower housing 30 at a right angle to one another. The detectors 132 detect radiation propagating in a downward direction. Referring to FIG. 15, a small reflecting cone 134 (shown exaggerated) is formed on the lower end of the bob 102. The cone 134 reflects the collimated beam back through the collimating lens assembly 70 and the steering window 44 to provide a ring of radiation which normally falls upon the detectors 132 to activate them.

Each detector 132 is covered with a mask 136 (FIG. 6) which has an aperture 137 formed in it over the active area of the detector 132. Each mask 136 is resilient and is mounted to the lower housing with a screw 139. Another screw 140 is used to adjust the location of the aperture 137 over the active area of the detector 132. The aperture 137 in each mask 136 is sized and each mask 136 is adjusted so that when the deflection of the bob 102 exceeds the linear deflection range, the energy received by at least one of the detectors 132 will be sufficiently diminished to deactivate the detector. Deactivation of at least one of the detectors 132 can then be used to generate a signal to a human operator that the transmitter 10 is out of level. See U.S. patent application Ser. No. 788,764, referred to above, for a complete description of how the signal is communicated to the operator.

In another embodiment, only one detector 132 is used. In this embodiment, the end of the bob 102 is sliced off at an angle to provide a nearly circular flat reflecting surface 139 as shown (exaggerated) in FIG. 16. The flat, angled surface provides a generally circular spot of radiation at the single detector 132 adjacent to the emitter 34. The aperture 137 is sized and the mask 136 is adjusted to deactivate the detector when the spot deviates sufficiently as the bob 102 deflects out of the linear range.

Figure 16:
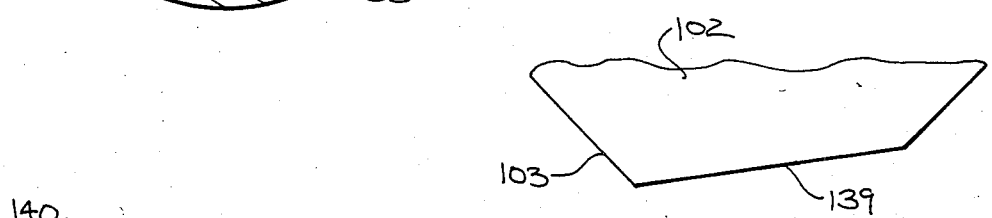
FIG. 16 is a detail view similar to FIG. 15 but showing an alternate embodiment.
Figure 17:
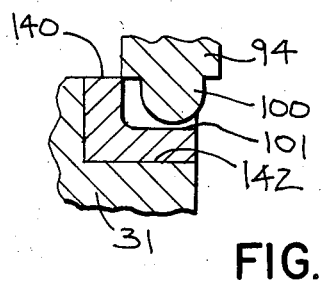
FIG. 17 is a detail view of an alternate embodiment of the lighthouse assembly which is intended to be incorporated with the embodiment of FIG. 16.

In the embodiment of FIG. 16, the spot of radiation must be radially aligned with the detector 132. To enable radial alignment, the grooves 101 can be formed in an annular ring 140 which is rotatable in an annular groove 142 at the top of the upper housing 31. When the angular alignment is completed by turning the reflector assembly 28 relative to the source 27, the screws 90 are tightened to clamp the reflector assembly in position.

In the field, the transmitter 10 need only be leveled to within the linear range of the deflection of the bob 102. This degree of accuracy is attainable by adjusting knurled thumbwheels 145 (FIG. 5) until the bubble-type level indicator 22 indicates the transmitter 10 is level. Turning of each thumbwheel 145 turns a screw 146 which is threaded in the chassis 16. The screw 146 has a domed end 148 captured between plates 149 and 150 which are secured together. A ball 151 facilitates turning of the thumbwheel 145 and a threaded sleeve 152 may conveniently be provided as part of the plate 149 to mount the base 18 on the tripod 12.

Figure 18:
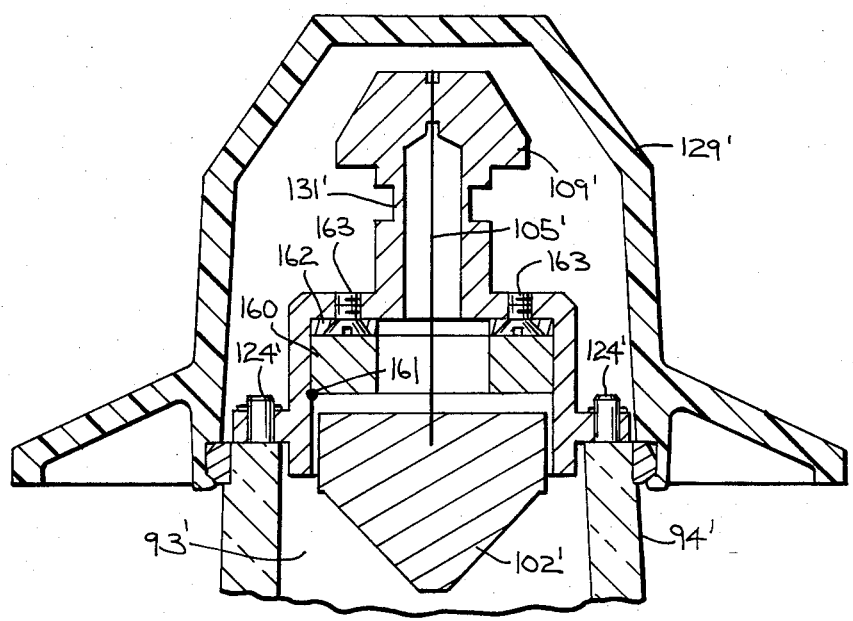
FIG. 18 is a fragmentary sectional view illustrating a preferred damping means for the bob.
Figure 19:
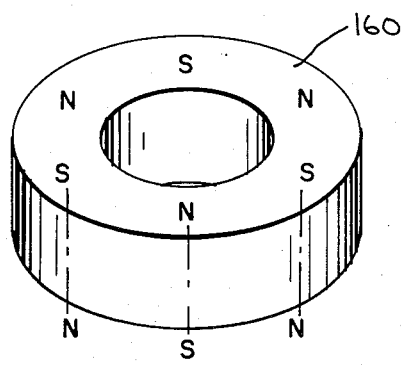
FIG. 19 is a perspective schematic view of a magnet for the damping means of FIG. 18.

The presently preferred embodiment for damping the movement of the bob 102' is shown in FIG. 18. It does not have the fluid 130 but instead employs magnetics to dampen the movement of the bob 102'. It includes an annular ceramic magnet 160 (FIG. 19) which is glued in place at 161 above the bob 102'. The magnet 160 has six poles of equal magnitude spaced equally on each of its faces. Directly below each pole on a face, an opposite pole exists. Above the magnet 160 is a keeper ring 162 secured to the cap 109' by screws 163. The keeper ring 162 is made of a ferro-magnetic material which provides a low reluctance path for the magnetic field. Note that the cap 109' and the sunshade 129' have been modified somewhat to accomodate the magnet damping means.

The magnet 160 generates magnetic flux lines which extend down into the bob 102'. Since the bob 102' is made of a conductive material, as it moves electric eddy currents are generated in it. These currents develop magnetic fields which oppose the magnetic field generated by the magnet 160. The opposing magnetic fields provide resistance to motion, thereby damping oscillations of the bob 102'.

By using the magnetic damping means described above, the fluid 130 is not necessary. Therefore, the radiation passes through air in the inner space 93'. This simplifies the ray diagram analysis inasmuch as $n_1$ or $N_1$ in the equations given above would be the index of refraction for air, which is about 1.0. Also, bouyant effects on the bob 102' can be neglected for the magnetic damping arrangement.

Also, in the embodiment of FIG. 18, the strand 105' is secured to the bob 102' and the cap 109' somewhat differently from the embodiment of FIG. 6. In the embodiment of FIG. 18, the strand 105' is pressed directly into the cap 109' and into the bob 102'. The holes in the cap 109' and the bob 102' for receiving the strand 105' are sized slightly smaller in diameter than the strand 105'. The ends of the strand 105' are then pushed into the respective holes a small length at a time to keep the strand 105' from buckling as it is pushed in.

Many modifications to the preferred embodiment will be apparent to those of ordinary skill in the art but which will still embody the invention. Therefore, the invention is not intended to be limited by the scope of the detailed description or the drawings, but by the claims which follow, except as otherwise required by law.

We claim:

1. A transmitter for an alignment system in which a field of electromagnetic radiation is propagated, said transmitter comprising:
   a source for providing a beam of electromagnetic radiation directed along a beam axis;
   a bob having a bob longitudinal axis;
   means for supporting the bob within the beam with the bob longitudinal axis parallel to the beam axis in a plumb condition, the beam being redirected omni-directionally by the bob in the plumb condition to define a reference field of radiation in a level condition;
   wherein an angular error between the plumb condition and the beam axis results in the bob longitudinal axis deviating angularly from the plumb condition to maintain the orientation of the reference field in the level condition; and
   a housing surrounding the bob, said housing having an inner surface and an outer surface and being made of a transparent material so that the reflected beam passes through the housing from the inner to the outer surface;
   wherein the housing is filled with a transparent liquid to dampen movements of the bob.

2. A transmitter for an alignment system in wich a field of electromagnetic radiation is propagated, said transmitter comprising:
   a source for providing a beam of electromagnetic radiation directed along a beam axis;
   a bob having a bob longitudinal axis;
   means for supporting the bob within the beam with the bob longitudinal axis parallel to the beam axis in a plumb condition, the beam being redirected omni-directionally by the bob in the plumb condition to define a reference field of radiation in a level condition;
   wherein an angular error between the plumb condition and the beam axis results in the bob longitudinal axis deviating angularly from the plumb condition to maintain the orientation of the reference field in the level condition;
   a housing surrounding the bob, said housing having an inner surface and an outer surface and being made of a transparent material so that the reflected beam passes through the housing from the inner to the outer surface; and
   wherein the inner and outer surfaces of the housing are conical, the relationship between the respective angles of the inner and outer surfaces being such that temperature effects on the orientation of the reference plane are minimized.

3. A transmitter for an alignment system in which a field of electromagnetic radiation is propagated, said transmitter comprising:
   a source for providing a beam of electromagnetic radiation directed along a beam axis;
   a bob having a bob longitudinal axis;
   means for supporting the bob within the beam with the bob longitudinal axis parallel to the beam axis in a plumb condition, the beam being redirected omni-directionally by the bob in the plumb condition to define a reference field of radiation in a level condition;
   wherein an angular error between the plumb condition and the beam axis results in the bob longitudinal axis deviating angularly from the plumb condition to maintain the orientation of the reference field in the level condition;
   a housing surrounding the bob, said housing having an inner surface and an outer surface and being made of a transparent material so that the reflected beam passes through the housing from the inner to the outer surface; and
   sensor means for detecting when the angular error between the beam axis and the plumb condition is outside of an acceptable range.

4. A transmitter as in claim 3, wherein the sensor means comprises:
   detector means spaced a distance beneath the bob for detecting electromagnetic radiation propagating toward the detector in a downward direction; and
   a reflector surface on the lower end of the bob directing electromagnetic radiation back to the detector means in an amount sufficient to activate the detector means in the acceptable range but not sufficient to activate the detector means outside of the acceptable range.

5. A transmitter as in claim 4, wherein:
   the detector means comprises a pair of detectors disposed at a right angle relative to one another about the center of the source; and the reflector surface on the lower end of the bob is conically shaped to reflect a ring of radiation back to the detectors.

6. A transmmiter as in claim 4, wherein:
the detector means comprises a single detector spaced laterally from the center of the source; and
the reflector surface on the lower end of the bob is a planar surface oriented at an angle to the bob longitudinal axis to reflect a generally circular spot of radiation back to the detector.

7. A transmitter for an alignment system in which a field of electromagnetic radiation is propagated, said transmitter comprising:
a source for providing a beam of electromagnetic radiation directed along a beam axis;
a bob having a bob longitudinal axis;
support means spaced a distance above the source;
means for suspending the bob within the beam from the support means with the bob longitudinal axis parallel to the beam axis in a plumb condition, the beam being redirected omni-directionally by the bob in the plumb condition to define a reference field of radiation in a level condition; and
a housing surrounding the bob, said housing having an inner surface and an outer surface and being made of a transparent material so that the reflected beam passes through the housing from the inner to the outer surface;
wherein an angular error between the plumb condition and the beam axis results in the bob longitudinal axis deviating angularly from the plumb condition to maintain the orientation of the reference field in the level condition; and
wherein the housing is filled with a transparent liquid to dampen movements of the bob.

8. A transmitter as in claim 7, wherein the inner and outer surfaces of the housing are conical, the relationship between the respective angles of the inner and outer surfaces being such that temperature effects on the orientation of the reference plane are minimized.

9. A transmitter for an alignment system in which a field of electromagnetic radiation is propagated, said transmitter comprising:
a source for providing a beam of electromagnetic radiation directed along a beam axis;
a bob having a bob longitudinal axis;
support means spaced a distance above the source;
means for suspending the bob within the beam from the support means with the bob longitudinal axis parallel to the beam axis in a plumb condition, the beam being redirected omni-directionally by the bob in the plumb condition to define a reference field of radiation in a level condition; and
a housing surrounding the bob, said housing having an inner surface and an outer surface and being made of a transparent material so that the reflected beam passes through the housing from the inner to the outer surface;
wherein an angular error between the plumb condition and the beam axis results in the bob longitudinal axis deviating angularly from the plumb condition to maintain the orientation of the reference field in the level condition; and
sensor means for detecting when the angular error between the beam axis and the plumb condition is outside of an acceptable range.

10. A transmitter as in claim 9, wherein the sensor means comprises:
detector means spaced a distance beneath the bob for detecting electromagnetic radiation propagating in a downward direction; and
a reflector surface on the lower end of the bob for directing electromagnetic radiation back to the detector means in an amount sufficient to activate the detector means in the acceptable range but not outside of the acceptable range.

11. A transmitter as in claim 10, wherein:
the detector means comprises a pair of detectors disposed at a right angle relative to one another about the longitudinal axis of the source; and
the reflector surface on the lower end of the bob is conically shaped to reflect a ring of radiation back to the detectors.

12. A transmitter as in claim 10, wherein:
the detector means comprises a single detector spaced laterally from the axis of the source; and
the reflector surface on the lower end of the bob is a planar surface oriented at an angle to the bob longitudinal axis to reflect a generally circular spot of radiation back to the detector.

* * * * *